United States Patent
Heyder et al.

(10) Patent No.: US 6,477,869 B2
(45) Date of Patent: Nov. 12, 2002

(54) DRIVE APPARATUS FOR A WASHING MACHINE

(75) Inventors: Reinhard Heyder, Berlin (DE); Jörg Skrippek, Priort (DE)

(73) Assignee: BSH Bosch und Siemens Hausgeräte GmbH, München (DE)

( * ) Notice: Subject to any disclaimer, the term of this patent is extended or adjusted under 35 U.S.C. 154(b) by 0 days.

(21) Appl. No.: 09/993,267

(22) Filed: Nov. 19, 2001

(65) Prior Publication Data

US 2002/0059817 A1 May 23, 2002

Related U.S. Application Data

(63) Continuation of application No. PCT/EP00/04443, filed on May 16, 2000.

(30) Foreign Application Priority Data

May 17, 1999 (DE) ............................... 199 22 610

(51) Int. Cl.[7] ................................................ D06F 37/30
(52) U.S. Cl. ........................................................ 68/140
(58) Field of Search ........................ 68/12.16, 24, 140

(56) References Cited

U.S. PATENT DOCUMENTS 5,809,809 A  *  9/1998 Neumann ..................... 68/140
5,862,686 A  *  1/1999 Skrippek ...................... 68/140
5,894,746 A  *  4/1999 Skrippek ...................... 68/140
5,996,379 A  * 12/1999 Skrippek ...................... 68/140
6,131,422 A  * 10/2000 Skrippek et al. .............. 68/140
6,148,647 A  * 11/2000 Kabeya et al. ................ 68/140

FOREIGN PATENT DOCUMENTS

DE   197 24 930 A1   12/1998
EP   0 780 507 A2    6/1997

* cited by examiner

Primary Examiner—Philip Coe
(74) Attorney, Agent, or Firm—Laurence A. Greenberg; Werner H. Stemer; Gregory L. Mayback

(57) ABSTRACT

A drive apparatus in a washing machine having a suds container with a rear face and a laundry drum mounted within the suds container includes a flat electric motor for directly driving the laundry drum. The motor is mounted on the rear face and has a stiff support connected thereto, a first bearing, a rotor with a hollow shaft, and a stator connected to the support. The stator and rotor are connected to one another through the first bearing and are jointly removable. A shaft floatingly mounts the laundry drum within the suds container and is mounted within the support through a second bearing. The shaft has a shaft journal projecting out of the support. The hollow shaft of the rotor surrounds the journal. The stator and rotor are jointly connected to the journal. Instead of the support, the rear wall can be reinforced to include the bearings therein.

32 Claims, 2 Drawing Sheets

DRIVE APPARATUS FOR A WASHING MACHINE

CROSS-REFERENCE TO RELATED APPLICATION

This application is a continuation of copending International Application No. PCT/EP00/04443, filed May 16, 2000, which designated the United States.

BACKGROUND OF THE INVENTION

FIELD OF THE INVENTION

The invention lies in the field of washing appliances. The invention relates to a drive apparatus for a washing machine having a laundry drum that is mounted in a floating manner through at least one approximately horizontal shaft and through bearings either in the rear wall or within a stiff supporting part that is fitted to the rear wall of a lye or suds container and is driven directly by a flat electric motor mounted on the rear face of the suds container on the supporting part. The stator and the rotor of the electric motor are connected to one another through a bearing and are jointly removable from the washing machine.

German Published, Non-Prosecuted Patent Application DE 195 47 745 A1, corresponding to U.S. Pat. No. 5,862,686 to Skrippek and to U.S. Pat. No. 5,894,746 to Skrippek, discloses such a drive apparatus for a front-loading washing machine. The drive apparatus has an electric motor that can be removed from the shaft as an entity. Therein, the stator in conjunction with a mounting disk also carries out the function of the supporting part. A bearing sleeve is formed as a flange on the stator, and forms bearing seats for roller bearings for the laundry drum shaft, which is surrounded by a hollow shaft. The hollow shaft is, itself, attached to the free end of the shaft by a screw connection. The hollow shaft is a component of the rotor, which is essentially in the form of a bell-shaped flange and has magnetic poles on the internal circumferential face of the bell-shaped attachment. The stator and the rotor can be removed jointly from the rear face of the suds container by undoing the attachment screws that connect the stator to the mounting disk, and undoing the central screw connection between the hollow shaft and the shaft, with the bearing between the stator and the rotor, which at the same time forms the bearing for the shaft, remaining between the stator and the rotor. Accordingly, once the stator and the rotor have been removed, the shaft remains, together with the laundry drum, without any support in the washing machine, and must be readjusted with respect to the stator when the electric motor is refitted. Such readjustment makes the assembly process more difficult.

SUMMARY OF THE INVENTION

It is accordingly an object of the invention to provide a drive apparatus for a washing machine that overcomes the hereinafore-mentioned disadvantages of the heretofore-known devices of this general type and that simplifies refitting and improves the drive device such that the electric motor can be removed more easily and more quickly from the rear wall of the suds container.

With the foregoing and other objects in view, in a washing machine having a suds container with a rear wall and a laundry drum mounted within the suds container there is provided, in accordance with the invention, a drive apparatus including a flat electric motor for directly driving the laundry drum, the motor mounted on the rear wall of the suds container, the motor having a stiff support connected to the rear wall of the suds container, a first bearing, a rotor having a hollow shaft, and a stator connected to the support, the stator and the rotor connected to one another through the first bearing and being jointly removable from the washing machine; a second bearing, a substantially horizontal shaft for mounting the laundry drum within the suds container in a floating manner, the shaft mounted within the support through the second bearing, the shaft having a shaft journal projecting out of the support, the shaft journal being surrounded by the hollow shaft of the rotor, and the stator and the rotor being jointly connected to the shaft journal.

With the objects of the invention in view, in a washing machine having a suds container with a rear wall and a laundry drum mounted within the suds container there is also provided a drive apparatus including a flat electric motor for directly driving the laundry drum, the motor mounted on the rear wall of the suds container, the motor having a first bearing, a rotor having a hollow shaft, and a stator connected to the rear wall, the stator and the rotor connected to one another through the first bearing and being jointly removable from the washing machine, a second bearing, a substantially horizontal shaft for mounting the laundry drum within the suds container in a floating manner, the shaft mounted within the rear wall through the second bearing, the shaft having a shaft journal projecting out of the rear wall, the shaft journal being surrounded by the hollow shaft of the rotor, and the stator and the rotor being jointly connected to the shaft journal.

The objectives of the invention are achieved by mounting the shaft through bearings either in the rear wall or within a stiff supporting part that is fitted to the rear wall, and by having a shaft journal that projects out of the rear wall of the suds container or out of the supporting part, that is surrounded by a hollow shaft formed by the rotor of the motor, and onto which the stator and the rotor of the electric motor can be pushed jointly.

On one hand, the invention ensures that the shaft is mounted securely in the rear wall or in the supporting part and, on the other hand, it ensures that the motor can be removed from the shaft as an entity. Even when the motor has been pulled off, the bearing for the shaft remains in the washing machine, so that the laundry drum can still be rotated even after removal of the motor.

Because the motor is supplied ready assembled as an entity to the manufacturer's works for washing machines, it can have the suds container system added to it easily there through the supporting part. Because extremely stringent requirements are placed on maintaining a small air gap (which is also as far as possible of the same size in all machines) between the stator and the rotor poles of an electric motor and on the central bearing, and because these requirements do not need to be complied with during assembly in a washing machine factory, a motor is provided as a complete entity according to the invention. The complete motor can easily be pushed onto the end of a shaft journal of the shaft of the laundry drum. The motor stator is connected to the supporting part, for example, by screw connections.

To allow the stator to be screwed to the supporting part, the rotor has apertures in its bottom part. The apertures ensure cooling of the stator windings so that the motor cannot become overheated, while, at the same time, having dimensions complying with requirements.

Thus, the motor has an open form, whose heat-producing components are cooled by the environmental air on all sides. Even the low motor rotation speed during the washing mode is still sufficient for the rotor to produce a heat-dissipating air movement.

As such, the motor can be completely assembled at the factory of a motor supplier, and can then be supplied to the washing machine factories, without any manufacturing tolerances in the washing machine factory having a negative influence on the electric motor. In accordance with another feature of the invention, the stator is connected to the cast supporting part or supporting star by a large number of screws, and the cast supporting part is normally disposed on the rear wall of the suds container, in which case further connections can also be provided between the rear wall or the casing wall of the suds container and the stator, as well, to provide additional protection for the stator.

In accordance with a further feature of the invention, one of the two bearings of the shaft at the same time forms the bearing between the stator and the rotor. The bearing is disposed between the shaft journal, which is adjacent to the shaft, and the hollow shaft surrounding the rotor. As such, the bearing that connects the stator to the rotor has precisely the same dimensions as the bearing through which the shaft is mounted in the bearing sleeve formed by the supporting part.

In accordance with an added feature of the invention, the support or the rear wall has a bearing sleeve and the second bearing is adjacent the bearing sleeve.

In accordance with an additional feature of the invention, the support or the rear wall has a bearing sleeve with an outer circumference, the stator has a central bearing sleeve with an inner circumference, and the outer circumference of the bearing sleeve is inserted into the inner circumference of the central bearing sleeve.

The bearing that supports the rotor in the stator advantageously rests axially against the end face (pointing away from the suds container) of the bearing sleeve of the supporting part. The bearing sleeve of the stator, which holds the bearing that is disposed between the stator and the rotor, additionally is disposed such that it can be pushed or plugged onto the outer circumference of the bearing sleeve of the supporting part. As such, the robustness of the motor is even further increased. The mounting of the bearing sleeve of the stator on the bearing sleeve of the supporting part with a push fit can also be used as the only attachment of the stator. As such, the need for the screw connections between the stator and the supporting part is eliminated.

In accordance with yet another feature of the invention, the rotor has a circumferential portion and openings disposed in a region between the hollow shaft and the circumferential portion, and the stator is connected to the support or rear wall through the openings.

In accordance with yet a further feature of the invention, the stator has pole packs and the rotor has a circumferential portion with an inner surface, a bell-like flange disposed at the circumferential portion pointing towards the suds container, and magnetic poles disposed at the inner surface opposite the pole packs and spaced apart from the pole packs to define an air gap therebetween.

In accordance with yet an added feature of the invention, the rotor has air movement parts for assisting air movement when the rotor rotates.

In accordance with yet an additional feature of the invention, the motor is advantageously in the form of an electronically commutated DC motor that, due to the lack of brushes, allows a long life.

In accordance with again another feature of the invention, the rotor is at least partially formed by an annular pack of electrical steel sheets, with permanent magnet segments disposed thereon. The permanent magnet segments produce a powerful torque, and the electrical steel sheets form a particularly good magnetic return path. The required laminated packs can be produced in a relatively uncomplicated manner, and cost-effectively, by automation of the stacking process. The pole packs of the stator are advantageously electrical steel sheets and are fitted with coils having the field windings.

In accordance with again a further feature of the invention, the stator has pole packs and the pole packs are electrical steel sheets fitted with coils having field windings.

In accordance with again an added feature of the invention, the motor is a switched reluctance motor. As such, the rotor is a ferromagnetically relatively poorly permeable material. The construction of the stator is comparable to that of the electronically commutated DC motor. The configuration results in the particular advantage of a more cost-effective configuration of the rotor, which does not require any expensive magnetic materials.

To simplify the assembly process such that it is reproducibly accurate, in accordance with again an additional feature of the invention, the centered connection of the rotor in a rotationally fixed manner on the shaft can be supplemented by an interlocking profiled shaft, a profiled hub, an adjusting spring, or a conical or tongue and groove connection.

In accordance with still another feature of the invention, the rotor is connected to the shaft journal in a centered connection and the centered connection is rotationally fixed in an interlocking manner by one of the group consisting of a profiled shaft, a profiled hub, an adjusting spring, a conical connection, and a tongue and groove connection.

In accordance with still a further feature of the invention, the stator and the rotor are jointly pushed onto the shaft journal.

In accordance with a concomitant feature of the invention, the first bearing is disposed between the stator and the rotor. Other features that are considered as characteristic for the invention are set forth in the appended claims.

Although the invention is illustrated and described herein as embodied in a drive apparatus for a washing machine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2a is a fragmentary, cross-sectional view of an alternative embodiment of the motor of FIG. 1a; and FIG. 2b is a fragmentary, cross-sectional view of the motor of FIG. 2a removed from the supporting part.

DESCRIPTION OF THE PREFERRED EMBODIMENTS

Figures 1A, 1B:
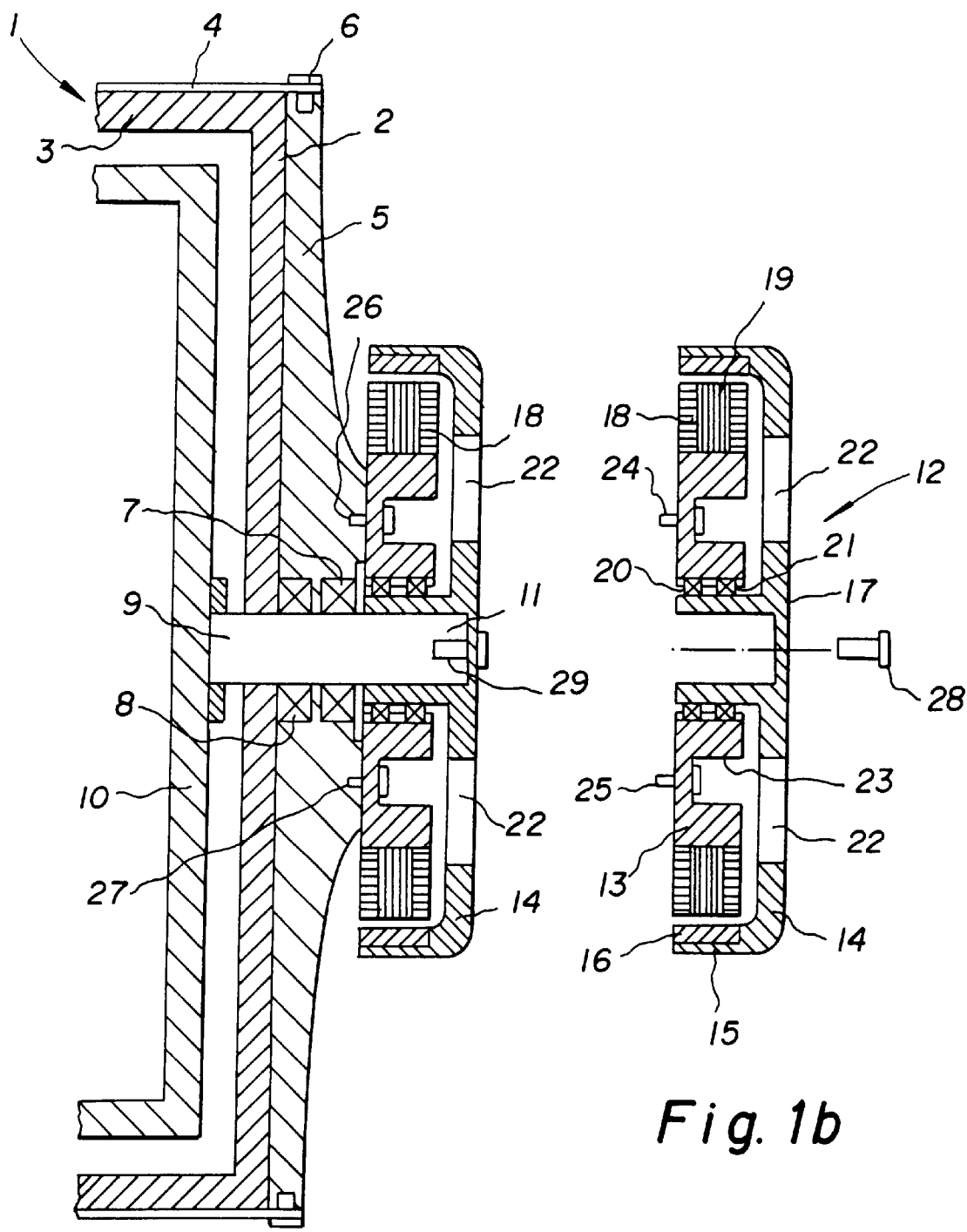
FIG. 1a is a fragmentary, cross-sectional view of a rear wall of a suds container having a drive shaft for a laundry drum and an electric motor fitted to a shaft journal of the drive shaft according to the invention.
FIG. 1b is a fragmentary, cross-sectional view of the motor of FIG. 1a removed from the supporting part.

Referring now to the figures of the drawings in detail and first, particularly to FIGS. 1a and 1b thereof, there is shown a suds container 1 having a rear wall 2, a casing 3, and an additional casing cover 4. A supporting part 5 above the casing cover 4 is connected through screw connections 6 to the suds container 1.

A shaft 9, that is to say, the drive shaft of a laundry drum 10, is mounted horizontally in the supporting part 5 through bearings 7 and 8, for example, ball bearings or roller bearings. An electric motor 12, which includes a stator 13 and a rotor 14, can be pushed onto a shaft journal 11. The rotor 14 is bell-shaped and, on the inside of one bell-shaped flange 15, has poles 16, which are permanent magnets and are distributed like segments on the circumference. The rotor 14 has a central, annular flange 17 that can be pushed onto the shaft journal 11 such that, after having been pushed on, it surrounds the shaft journal 11 forming an interlock, and, preferably, also such that power can be transmitted. Thus, the annular flange 17 forms a hollow shaft.

Apertures 22 in the bottom region of the bell-shaped rotor 14 allow access for cooling air to laminated packs 19, which are surrounded by field windings 18, of the stator 13. The rotor 12 is mounted through ball bearings or roller bearings 20, 21 in a flange 23, which is in the form of an annular bearing sleeve, on the stator 13. The stator 13 is screwed to the supporting part 5 by screws 24, 25, which are accessible through the apertures 22, in corresponding holes 26, 27, which are provided with screw threads.

The rotor 14 is connected in a corresponding manner to the shaft journal 11 through a central screw 28, which is screwed into a hole 29.

By undoing the screws 24, 25, 28, the motor 12 can be pulled off the shaft journal 11 as an entity. The supporting part 5, which is physically compact, ensures a high level of robustness.

Figures 2A, 2B:
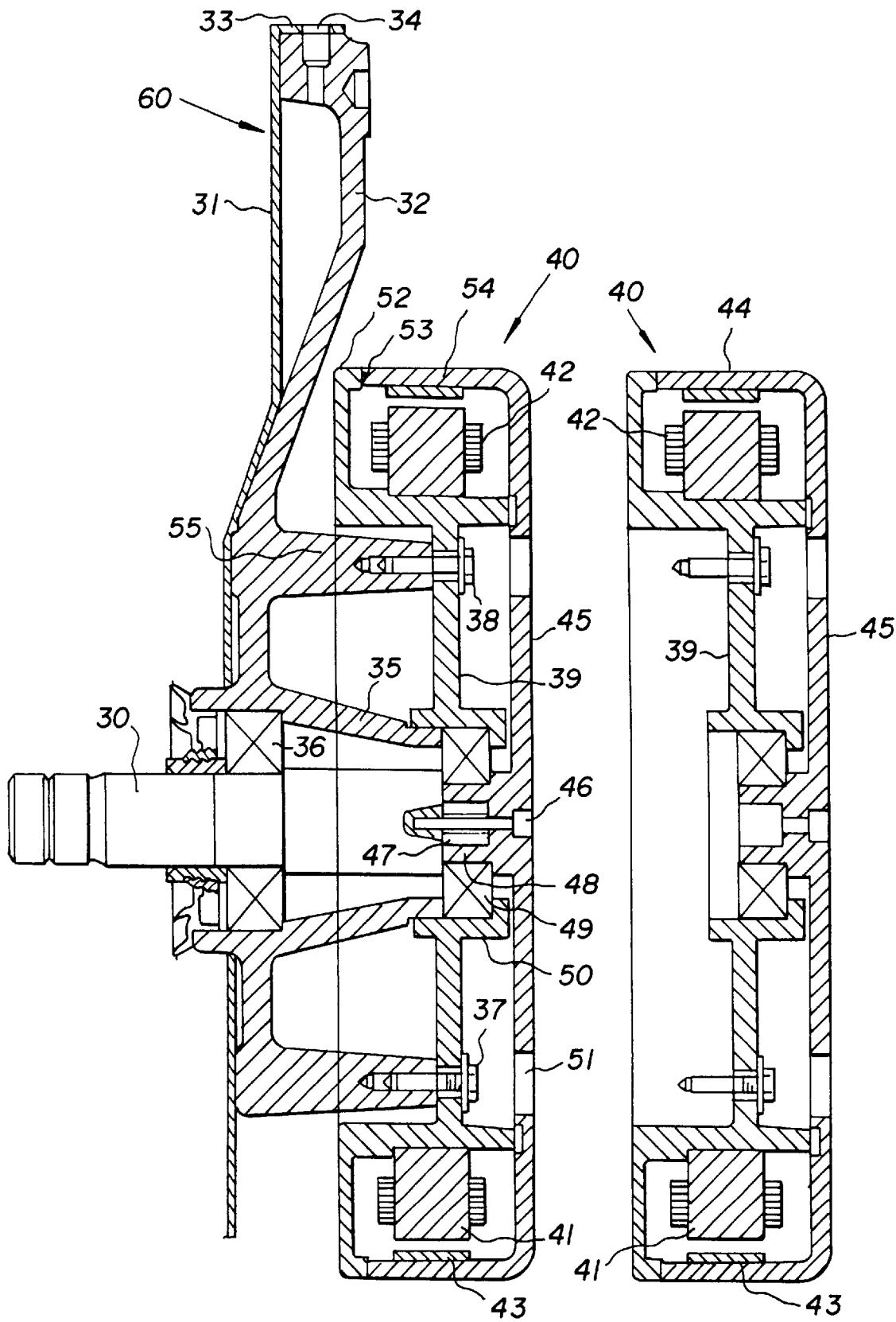

In a further exemplary embodiment (see FIGS. 2*a* and 2*b*), a non-illustrated laundry drum is mounted in a floating manner through a shaft 30 in a suds container 60, which has a rear wall 31. A supporting part or supporting star 32 that, for example, is in the form of beams, is attached to the rear wall 31, in particular, also on a side collar 33 of the rear wall 31 through a screw connection 34. To support the shaft 30 of the laundry drum, the supporting part 32 has a bearing sleeve 35, in which a roller bearing or a ball bearing 36 is mounted. An annular flange 55 extends essentially concentrically with respect to the bearing sleeve 35, and a stator 39 of an electric motor 40 is attached to the flange 55, through attachment screws 37, 38. The stator 39 is essentially in the form of a plate and has laminated packs 41 fitted to its outer collar. The laminated packs 41 are surrounded by field windings 42. The laminated packs 41 are opposite magnetic poles 43, separated through a very small air gap. The poles 43 are disposed on the inner circumference of the bell rim 44 of a rotor 45.

The rotor 45 is attached through a central attachment screw 46 to a shaft journal 47, which is fitted to the shaft 30. The rotor 45 has a hollow shaft 48 that surrounds the shaft journal 47, with the shaft journal 47 and the hollow shaft 48 jointly being supported with respect to the stator 39 in a roller bearing or ball bearing 49 that, at the side, is adjacent to one side end of the shaft 30. The stator 39 has a central, annular flange 50.

The attachment screws 37, 38 for the stator 39 are accessible through apertures 51 in the bottom of the rotor 45. The annular flange 50 can at least partially be pushed onto the outer circumference of the bearing sleeve 35, so that the electric motor 40 has additional robustness, and produces a firm connection between the supporting part 32 and the stator 39 of the electric motor 40. Thus, both the roller or ball bearing 49 and the roller or ball bearing 36 are provided with the function of a bearing for the shaft 30. The configuration saves the need for additional bearings 20, 21 in comparison with the embodiment illustrated in FIGS. 1*a* and 1*b*, these being used exclusively for supporting the rotor with respect to the stator. Thus, the roller or ball bearing 49 has two functions: first, it supports the rotor 45 with respect to the stator 39 and, second, it supports the shaft 30 with respect to the stator 39, which is firmly connected to the supporting part 32. Because there is no need for additional bearings between the stator 39 and the rotor 45, the configuration results in a particularly cost-effective embodiment of an electric motor that, furthermore, can still easily be pulled off the shaft journal 47 because it has only a short hollow shaft 48.

A further advantageous feature of the electric motor 40 is that the stator 39 is seated on a collar 52, which is separated through a labyrinth seal 53 from the bell rim 44 of the rotor 45. Thus, the ingress of dirt particles into the area between the poles 43 and the laminated packs 41 is largely prevented.

An interlocking, rotationally fixed connection between the rotor 14, 45 and the shaft journal 11, 47 is formed by a profiled shaft, a profiled hub, an adjusting spring, or a conical or tongue and groove connection.

Instead of the supporting parts 5, 32, it is also possible for the rear wall 2 or 31 to be reinforced to a sufficient extent that the bearings 8 and 9 or 36 are formed therein.

The invention described above can be used for both top-loading and front-loading washing machines.

We claim:

1. In a washing machine having a suds container with a rear face and a laundry drum mounted within the suds container, a drive apparatus comprising:

a flat electric motor for directly driving the laundry drum, said motor mounted on the rear face of the suds container, said motor having:
   a stiff support connected to the rear face of the suds container;
   a first bearing;
   a rotor having a hollow shaft; and
   a stator connected to said support;
said stator and said rotor connected to one another through said first bearing and being jointly removable from the washing machine;
a second bearing;
a substantially horizontal shaft for mounting the laundry drum within the suds container in a floating manner, said shaft mounted within said support through said second bearing, said shaft having a shaft journal projecting out of said support, said shaft journal being surrounded by said hollow shaft of said rotor; and
said stator and said rotor being jointly connected to said shaft journal.

2. The drive apparatus according to claim 1, wherein said second bearing and said first bearing are formed as one bearing unit.

3. The drive apparatus according to claim 2, wherein:
said support has a bearing sleeve; and
said second bearing is adjacent said bearing sleeve.

4. The drive apparatus according to claim 3, wherein said second bearing is axially adjacent said bearing sleeve.

5. The drive apparatus according to claim 2 wherein:
said support has a bearing sleeve with an outer circumference;
said stator has a central bearing sleeve with an inner circumference; and
said outer circumference of said bearing sleeve is inserted into said inner circumference of said central bearing sleeve.

6. The drive apparatus according to claim 1, wherein:
said rotor has:
- a circumferential portion; and
- openings disposed in a region between said hollow shaft and said circumferential portion; and said stator is connected to said support through said openings.

7. The drive apparatus according to claim 1, wherein said stator is connected to said support by screws.

8. The drive apparatus according to claim 1, wherein:
said stator has pole packs; and
said rotor has:
- a circumferential portion with an inner surface;
- a bell-like flange disposed at said circumferential portion pointing towards the suds container; and
- magnetic poles disposed at said inner surface opposite said pole packs and spaced apart from said pole packs to define an air gap therebetween.

9. The drive apparatus according to claim 8, wherein:
said stator has pole packs; and
said pole packs are electrical steel sheets fitted with coils having field windings.

10. The drive apparatus according to claim 1, wherein said rotor has air movement parts for assisting air movement when said rotor rotates.

11. The drive apparatus according to claim 1, wherein said motor is an electronically commutated DC motor.

12. The drive apparatus according to claim 11, wherein:
said stator has pole packs; and
said pole packs are electrical steel sheets fitted with coils having field windings.

13. The drive apparatus according to claim 1, wherein said motor is a switched reluctance motor.

14. The drive apparatus according to claim 1, wherein:
said rotor is connected to said shaft journal in a centered connection; and
said centered connection is rotationally fixed in an interlocking manner by one of the group consisting of a profiled shaft, a profiled hub, an adjusting spring, a conical connection, and a tongue and groove connection.

15. The drive apparatus according to claim 1, wherein said stator and said rotor are jointly pushed onto said shaft journal.

16. The drive apparatus according to claim 1, wherein said first bearing is disposed between said stator and said rotor.

17. In a washing machine having a suds container with a rear wall and a laundry drum mounted within the suds container, a drive apparatus comprising:
a flat electric motor for directly driving the laundry drum, said motor mounted on the rear wall of the suds container, said motor having:
a first bearing;
a rotor having a hollow shaft; and
a stator connected to the rear wall;
said stator and said rotor connected to one another through said first bearing and being jointly removable from the washing machine;
a second bearing;
a substantially horizontal shaft for mounting the laundry drum within the suds container in a floating manner, said shaft mounted within the rear wall through said second bearing, said shaft having a shaft journal projecting out of the rear wall, said shaft journal being surrounded by said hollow shaft of said rotor; and
said stator and said rotor being jointly connected to said shaft journal.

18. The drive apparatus according to claim 17, wherein said second bearing and said first bearing are formed as one bearing unit.

19. The drive apparatus according to claim 18, wherein:
the rear wall has a bearing sleeve; and
said second bearing is adjacent the bearing sleeve.

20. The drive apparatus according to claim 19, wherein said second bearing is axially adjacent the bearing sleeve.

21. The drive apparatus according to claim 18, wherein:
the rear wall has a bearing sleeve with an outer circumference;
said stator has a central bearing sleeve with an inner circumference; and
the outer circumference of the bearing sleeve is inserted into said inner circumference of said central bearing sleeve.

22. The drive apparatus according to claim 17, wherein:
said rotor has:
- a circumferential portion; and
- openings disposed in a region between said hollow shaft and said circumferential portion; and said stator is connected to the rear wall through said openings.

23. The drive apparatus according to claim 17, wherein said stator is connected to the rear wall by screws.

24. The drive apparatus according to claim 17, wherein:
said stator has pole packs; and
said rotor has:
- a circumferential portion with an inner surface;
- a bell-like flange disposed at said circumferential portion pointing towards the suds container; and
- magnetic poles disposed at said inner surface opposite said pole packs and spaced apart from said pole packs to define an air gap therebetween.

25. The drive apparatus according to claim 24, wherein:
said stator has pole packs; and
said pole packs are electrical steel sheets fitted with coils having field windings.

26. The drive apparatus according to claim 17, wherein said rotor has air movement parts for assisting air movement when said rotor rotates.

27. The drive apparatus according to claim 17, wherein said motor is an electronically commutated DC motor.

28. The drive apparatus according to claim 27, wherein:
said stator has pole packs; and
said pole packs are electrical steel sheets fitted with coils having field windings.

29. The drive apparatus according to claim 17, wherein said motor is a switched reluctance motor.

30. The drive apparatus according to claim 17, wherein:
said rotor is connected to said shaft journal in a centered connection; and
said centered connection is rotationally fixed in an interlocking manner by one of the group consisting of a profiled shaft, a profiled hub, an adjusting spring, a conical connection, and a tongue and groove connection.

31. The drive apparatus according to claim 17, wherein said stator and said rotor are jointly pushed onto said shaft journal.

32. The drive apparatus according to claim 17, wherein said first bearing is disposed between said stator and said rotor.

* * * * *